United States Patent [19]

Sigl et al.

[11] Patent Number: 5,117,933
[45] Date of Patent: Jun. 2, 1992

[54] DRIVE SLIP REGULATING SYSTEM FOR A FOUR-WHEEL DRIVE VEHICLE

[75] Inventors: Alfred Sigl, Sersheim; Martin Meurer, Cochem/Mosel, both of Fed. Rep. of Germany

[73] Assignee: Robert Bosch GmbH, Stuttgart, Fed. Rep. of Germany

[21] Appl. No.: 411,535

[22] PCT Filed: Feb. 23, 1988

[86] PCT No.: PCT/EP88/00131
§ 371 Date: Dec. 1, 1989
§ 102(e) Date: Dec. 1, 1989

[87] PCT Pub. No.: WO88/07456
PCT Pub. Date: Oct. 6, 1988

[30] Foreign Application Priority Data

Apr. 1, 1987 [DE] Fed. Rep. of Germany ....... 3710870

[51] Int. Cl.$^5$ ............................................. B60K 28/16
[52] U.S. Cl. ............................ 180/197; 364/426.02; 364/426.03
[58] Field of Search ............................. 180/197, 179; 364/426.02, 426.03

[56] References Cited

U.S. PATENT DOCUMENTS

| | | | |
|---|---|---|---|
| 4,589,511 | 5/1986 | Leiber | 180/197 |
| 4,760,893 | 8/1988 | Sigl et al. | 303/109 X |
| 4,763,262 | 8/1988 | Leiber | 180/197 X |
| 4,771,849 | 9/1988 | Leiber et al. | 180/197 |
| 4,779,696 | 10/1988 | Harada et al. | 180/197 |

Primary Examiner—Mitchell J. Hill
Attorney, Agent, or Firm—Felfe & Lynch

[57] ABSTRACT

Drive torque determined from the throttle position and engine speed is used to compute the maximum possible instantaneous vehicle acceleration, which in turn is used to limit the increase of the reference value, such as a vehicle reference speed. The reference value is used to generate slippage values, which in turn are used to control braking and engine torque in a four wheel drive vehicle.

3 Claims, 1 Drawing Sheet

DRIVE SLIP REGULATING SYSTEM FOR A FOUR-WHEEL DRIVE VEHICLE

BACKGROUND OF THE INVENTION

The invention relates to a drive slippage control system for a four wheel drive vehicle, which system provides slippage values used for controlled braking of the wheels and/or controlling the drive torque. The slippage values are derived from the speed signals of the wheels and a reference value approximated to the vehicle speed derived from the wheel speed signals.

In case all-wheel driven vehicles start on low ground it is possible that all wheels are accelerated more rapidly as compared to the vehicle acceleration. For a high friction value, however, the wheel acceleration will conform with the vehicle acceleration. Based on this situation, it is difficult to form a reference value, which is required to determine the wheel slippage (drive slippage).

SUMMARY OF THE INVENTION

It is hence an object of the invention to form the reference value when all four wheels are slipping.

This object is accomplished by calculating a maximum-possible vehicle acceleration which in turn limits the possible increase in the reference value. This maximum possible acceleration is determined from the vehicle torque, which may be calculated from the throttle position and the engine speed.

BRIEF DESCRIPTION OF THE DRAWING

The sole FIGURE is a block diagram of the regulating system.

DESCRIPTION OF THE PREFERRED EMBODIMENT

Figure 1:
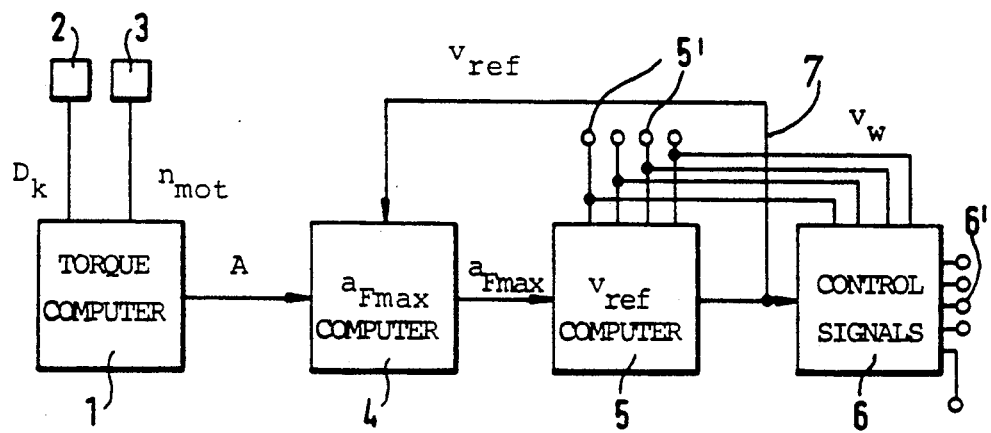

In a computing block 1 to which the throttle position $D_K$ is supplied by a sensor 2 and the engine speed $n_{mot}$ is supplied by a sensor 3, the instantaneous driving torque A is calculated based on the values supplied according to the relation $$A = K_1 D_K + K_2 n_{mot} + K_3$$

wherein $K_i$ are constants which are functions of the specific engine data and the various engine types (Otto, Diesel, aspirated or charged engine). The driving torque can also be determined from a suitably stored engine data field. The vehicle has a transmission characterized by a transmission multiplication between the engine and wheels.

From an output of block 1 the value A as determined is, together with a reference value (as vehicle speed), supplied to a further computing block 4 which calculates the maximum-possible vehicle acceleration $a_{Fmax}$ from the instantaneous driving torque and the vehicle speed while allowing for instantaneous transmission multiplication, according to the relation:

$$a_{Fmax} = c_1 A + c_2 \omega + c_3 v_{ref} + c_4$$

wherein $c_i$ are constants which are a function of the various vehicle parameters (dynamic radius, air resistance coefficient, weight of vehicle, etc.) and the parameters of the drive line (transmission data, moments of inertia) and wherein $\omega$ is the wheel acceleration. The kinetic energy in the drive line and the dead times present are allowed for when determining $a_{Fmax}$.

This acceleration value is supplied to a block 5 to which signals corresponding to the wheel speeds $v_{ref}$ are also supplied via terminals 5' and which forms, based on this data, the reference value approximated to the vehicle speed. This is indicated as $v_{ref}$ in the FIGURE. The maximum-possible instantaneous vehicle acceleration $a_{Fmax}$ is used to limit the increase of the vehicle speed; if the wheel speeds signal a stronger increase, the latter is not admitted; what is admitted is an increase along with the maximum-possible instantaneous vehicle acceleration. The reference value formed in block 5 is then supplied to a block 6 which generates control signals from the supplied wheel speeds $v_{ref}$ and the reference value so as to brake individual wheels and/or reduce the engine momentum (terminals 6'). As already mentioned the reference value, such as vehicle speed is, supplied to the block 4 via a line 7.

We claim:

1. Drive slippage control system for a vehicle in which all four wheels are driven by an engine which has an engine speed and develops drive torque, said vehicle moving at a vehicle speed, said wheels rotating at respective wheel speeds, and said drive torque being represented by an instantaneous drive torque at every instant in time, said vehicle further comprising a throttle having a throttle position, said control system comprising means for detecting the wheel speeds and forming wheel speed signals;

means for determining the instantaneous drive torque of the engine, means for determining the maximum possible vehicle acceleration from the instantaneous drive torque, means for computing a reference value approximated to the vehicle speed, said reference value being derived from the wheel speed signals and being limited by the maximum possible vehicle acceleration, and means for comparing said wheel speeds to said reference value to generate slippage values which are used to control braking of the wheels and/or the drive torque of the engine.

2. Drive slippage control system as in claim 1 wherein said means for determining the instantaneous drive torque of the engine comprises means for measuring the throttle position, and means for measuring the engine speed.

3. Drive slippage control in accordance with claim 2 wherein said vehicle has a transmission characterized by a transmission multiplication between the engine and the wheels, said means for determining the maximum possible vehicle acceleration comparing the reference value to the engine speed while allowing for said transmission multiplication.

* * * * *